US012287087B2

United States Patent
Van Bommel et al.

(10) Patent No.: US 12,287,087 B2
(45) Date of Patent: Apr. 29, 2025

(54) HIGH BRIGHTNESS LIGHT SOURCE COMPRISING A BLUE LASER PUMPING A GREEN YELLOW PHOSPHOR AND A YELLOW ORANGE SUPERLUMINESCENT DIODE PUMPING A RED PHOSPHOR

(71) Applicant: SIGNIFY HOLDING B.V., Eindhoven (NL)

(72) Inventors: Ties Van Bommel, Horst (NL); Martinus Petrus Joseph Peeters, Weert (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/558,751

(22) PCT Filed: Apr. 25, 2022

(86) PCT No.: PCT/EP2022/060821
§ 371 (c)(1),
(2) Date: Nov. 3, 2023

(87) PCT Pub. No.: WO2022/233618
PCT Pub. Date: Nov. 10, 2022

(65) Prior Publication Data
US 2025/0075881 A1     Mar. 6, 2025

(30) Foreign Application Priority Data
May 4, 2021    (EP) .................................... 21171933

(51) Int. Cl.
*F21V 9/38*       (2018.01)
*C09K 11/77*     (2006.01)
*F21Y 113/20*   (2016.01)

(52) U.S. Cl.
CPC .......... *F21V 9/38* (2018.02); *C09K 11/77217* (2021.01); *C09K 11/7731* (2013.01);
(Continued)

(58) Field of Classification Search
CPC ........ C09K 11/77348; C09K 11/77346; C09K 11/77218; C09K 11/77747;
(Continued)

(56) References Cited

U.S. PATENT DOCUMENTS

| | | | | |
|---|---|---|---|---|
| 2001/0017776 A1* | 8/2001 | Solodovnokov | ...... | H01S 5/4025 362/268 |
| 2014/0111967 A1* | 4/2014 | Rehn | .................... | G02B 27/141 362/84 |

(Continued)

FOREIGN PATENT DOCUMENTS

| | | |
|---|---|---|
| EP | 3666165 A1 | 6/2020 |
| WO | 2016037773 A2 | 3/2016 |

(Continued)

OTHER PUBLICATIONS

Majid et al., "First demonstration of InGaP/InAlGaP based 608nm orange laser and 583nm yellow superluminescent diode", RESEARCHGATE (2015) IEEE, 575-576. https://www.researchgate.net/publication/304285844.

*Primary Examiner* — Christopher M Raabe

(57) ABSTRACT

The invention provides a light generating system (1000) comprising (i) a plurality of light sources (110, 120, . . . ), (ii) a first luminescent material (210), and (iii) a second luminescent material (220), wherein: (a) a first light source (110) is configured to generate first light source light (111) having one or more wavelengths in the blue wavelength range and having a first centroid wavelength ($\lambda C1$), wherein the first light source (110) is a laser; (b) the first luminescent material (210) is configured to convert at least part of the first light source light (111) into first luminescent material
(Continued)

light (211) having one or more wavelengths in the green and/or yellow wavelength range; (c) a second light source (120) is configured to generate second light source light (121) having one or more wavelengths in the yellow and/or orange wavelength range and having a second centroid wavelength ($\lambda C2$), wherein $\lambda C2 > \lambda C1$; wherein the second light source (120) is a superluminescent diode; (d) the second luminescent material (220) is configured to convert at least part of the second light source light (121) into second luminescent material light (221) having one or more wavelengths in the orange and/or red wavelength range; and (e) in an operational mode the light generating system (1000) is configured to generate system light (1001) comprising the first luminescent material light (211) and the second luminescent material light (221).

15 Claims, 6 Drawing Sheets

(52) U.S. Cl.
CPC .. *C09K 11/77346* (2021.01); *C09K 11/77348* (2021.01); *C09K 11/7774* (2013.01); *C09K 11/77747* (2021.01); *C09K 11/7792* (2013.01); *F21Y 2113/20* (2016.08)

(58) Field of Classification Search
CPC ............ C09K 11/7731; C09K 11/7774; C09K 11/7792; F21V 9/38
USPC .......................................................... 362/84
See application file for complete search history.

(56) References Cited

U.S. PATENT DOCUMENTS

| | | |
|---|---|---|
| 2018/0316160 A1 | 11/2018 | Raring et al. |
| 2019/0037185 A1 | 1/2019 | Tarpan et al. |
| 2019/0097722 A1 | 3/2019 | McLaurin et al. |
| 2020/0192017 A1* | 6/2020 | Dülk ................... G01B 9/02091 |
| 2020/0232618 A1* | 7/2020 | Rudy ........................ B60Q 1/04 |
| 2022/0333745 A1* | 10/2022 | Goutain ................ H01Q 5/0235 |
| 2023/0047142 A1* | 2/2023 | Ooi ....................... H04B 10/614 |
| 2023/0313954 A1* | 10/2023 | Cornelissen .......... H01S 5/0071 |
| | | 362/84 |
| 2024/0077666 A1* | 3/2024 | Van Bommel ....... G02B 6/0068 |
| 2024/0392946 A1* | 11/2024 | Van Der Lubbe ..... B01J 19/121 |

FOREIGN PATENT DOCUMENTS

| | | |
|---|---|---|
| WO | 2016059259 A1 | 4/2016 |
| WO | 2016037773 A3 | 5/2016 |

* cited by examiner

HIGH BRIGHTNESS LIGHT SOURCE COMPRISING A BLUE LASER PUMPING A GREEN YELLOW PHOSPHOR AND A YELLOW ORANGE SUPERLUMINESCENT DIODE PUMPING A RED PHOSPHOR

CROSS-REFERENCE TO PRIOR APPLICATIONS

This application is the U.S. National Phase application under 35 U.S.C. § 371 of International Application No. PCT/EP2022/060821, filed on Apr. 25, 2022, which claims the benefit of European Patent Application No. 21171933.1, filed on May 4, 2021. These applications are hereby incorporated by reference herein.

FIELD OF THE INVENTION

The invention relates to a light generating system and to a light generating device comprising such light generating system.

BACKGROUND OF THE INVENTION

White light sources using a laser diode and phosphor are known in the art. US2018/0316160, for instance, describes a device and method for an integrated white colored electromagnetic radiation source using a combination of laser diode excitation sources based on gallium and nitrogen containing materials and light emitting source based on phosphor materials. A violet, blue, or other wavelength laser diode source based on gallium and nitrogen materials may be closely integrated with phosphor materials, such as yellow phosphors, to form a compact, high-brightness, and highly-efficient, white light source. The phosphor material is provided with a plurality of scattering centers scribed on an excitation surface or inside bulk of a plate to scatter electromagnetic radiation of a laser beam from the excitation source incident on the excitation surface to enhance generation and quality of an emitted light from the phosphor material for outputting a white light emission either in reflection mode or transmission mode.

SUMMARY OF THE INVENTION

While white LED sources can give an intensity of e.g. up to about 300 lm/mm$^2$; static phosphor converted laser white sources can give an intensity even up to about 20.000 lm/mm$^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

There is a desire for high intensity light generating devices and/or light generating devices have a controllable spectral power distribution of the light generated by the light generating device. Further, there is a desire to reduce heat generation.

A fully laser based solution may lead to spectral power distributions with a color rendering index (CRI) that may be lower than desirable. Further, laser-luminescent material based solutions may lead to the use of luminescent materials with relative large Stokes-shift, and thus a relatively large heat generation. Further, not at all wavelengths lasers may be available at high intensity (and/or efficiency).

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

In a first aspect, the invention provides a light generating system ("system") comprising (i) a plurality of light sources, (ii) a first luminescent material, and (iii) a second luminescent material. Especially, in embodiments a first light source (of the plurality of light sources) may be configured to generate first light source light, especially having one or more wavelengths in the blue wavelength range. Further, the first light may have a first centroid wavelength ($\lambda_{C2}$). Especially, in embodiments the first light source may comprise a laser. Further, in embodiments the first luminescent material may be configured to convert at least part of the first light source light into first luminescent material light, especially in further embodiments having one or more wavelengths in the green and/or yellow wavelength range. Especially, in embodiments a second light source (of the plurality of light sources) may be configured to generate second light source light, especially having one or more wavelengths in the yellow and/or orange wavelength range. Further, the second light may have a second centroid wavelength ($\lambda_{C2}$). Especially, in embodiments $\lambda_{C2} > \lambda_{C1}$. Yet further, in embodiments the second light source may comprise a superluminescent diode. Further, in embodiments the second luminescent material may be configured to convert at least part of the second light source light into second luminescent material light, especially in further embodiments having one or more wavelengths in the orange and/or red wavelength range. Yet, in embodiments in an operational mode (of the light generating system) the light generating system may be configured to generate system light comprising the first luminescent material light and the second luminescent material light. Hence, in embodiments the invention provides a light generating system comprising (i) a plurality of light sources, (ii) a first luminescent material, and (iii) a second luminescent material, wherein: (a) a first light source is configured to generate first light source light having one or more wavelengths in the blue wavelength range and having a first centroid wavelength ($\lambda_{C1}$), wherein the first light source is a laser; (b) the first luminescent material is configured to convert at least part of the first light source light into first luminescent material light having one or more wavelengths in the green and/or yellow wavelength range; (c) a second light source is configured to generate second light source light having one or more wavelengths in the yellow and/or orange wavelength range and having a second centroid wavelength ($\lambda_{C2}$), wherein $\lambda_{C2} > \lambda_{C1}$; wherein the second light source is a superluminescent diode; (d) the second luminescent material is configured to convert at least part of the second light source light into second luminescent material light having one or more wavelengths in the orange and/or red wavelength range; and (e) in an operational mode the light generating system is configured to generate system light comprising the first luminescent material light and the second luminescent material light.

With such system it may be possible to provide white light with a relatively high intensity. Further, (white) light may be provided having a controllable color point, and/or controllable correlated color temperature (CCT), and/or controllable color rendering index (CRI). Further, with such system heat management may be better than with e.g. a single blue pump light source. Further, a relatively small device may be provided which may be able to provide light with a relatively high intensity.

As indicated above, the light generating system comprises a plurality of light sources. The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc . . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs).

In embodiments, the light source may comprise a LED with on-chip optics. In embodiments, the light source comprises a pixelated single LEDs (with or without optics) (offering in embodiments on-chip beam steering).

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:CaF$_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:YCa$_4$O(BO$_3$)$_3$ or Nd:YCOB, neodymium doped yttrium orthovanadate (Nd:YVO$_4$) laser, neodymium glass (Nd:glass) laser, neodymium YLF (Nd:YLF) solid-state laser, promethium 147 doped phosphate glass (147Pm$^{3+}$:glass) solid-state laser, ruby laser (Al$_2$O$_3$:Cr$^{3+}$), thulium YAG (Tm:YAG) laser, titanium sapphire (Ti:sapphire; Al$_2$O$_3$:Ti$^{3+}$) laser, trivalent uranium doped calcium fluoride (U:CaF$_2$) solid-state laser, Ytterbium doped glass laser (rod, plate/chip, and fiber), Ytterbium YAG (Yb:YAG) laser, Yb$_2$O$_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heatsinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light. The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light source is especially configured to generate light source light having an optical axis (O), (a beam shape,) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments≤2° (FWHM), more especially≤1° (FWHM), most especially≤0.5° (FWHM). Hence, ≤2° (FWHM) may be considered (highly) collimated light source light. Optics may be used to provide (high) collimation (see also above).

Superluminescent diodes are known in the art. A superluminescent diode may be indicated as a semiconductor device which may be able to emit low-coherence light of a broad spectrum like a LED, while having a brightness in the order of a laser diode. US2020192017 indicates for instance that "With current technology, a single SLED is capable of emitting over a bandwidth of, for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission". Further, superluminescent diodes are amongst others described, in "Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) "is an emitter, which combines the features of laser diodes and light-emitting diodes. SLD emitters utilize the stimulated emission, which means that these devices operate at current densities similar to those of laser diodes. The main difference between LDs and SLDs is that in the latter case, we design the device waveguide in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications.

The system may at least comprise a first light source and at least a second light source. The term "first light source" may refer to one or more first light sources. The term "second light source" may refer to one or more second light sources. A difference between the first light source and the second light source may especially be the spectral power distribution. The former may have a spectral power distribution mainly in the blue and the latter may have a spectral power distribution mainly in the yellow and/or orange.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm.

The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range. Especially, a blue emitting solid state light source having a spectral power distribution with intensities at one or more wavelengths in the 440-495 nm wavelength range may have a centroid wavelength (of the spectral power distribution) in such wavelength range (i.e. the 440-495 nm wavelength range). Likewise, this may apply in analogy to similar phrases.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

Hence, in embodiments the first light source may be configured to generate light having one or more wavelengths in the wavelength range of 440-495 nm, especially having a (first) centroid wavelength and/or peak wavelength in this wavelength range. For instance, in embodiments the first light source may be configured to generate light having a centroid wavelength selected from the wavelength range of 440-495 nm. Hence, in embodiments the first centroid wavelength may be selected from the blue wavelength range.

Yet, in embodiments the second light source may be configured to generate light having one or more wavelengths in the wavelength range of 570-620 nm, especially having a (second) centroid wavelength and/or peak wavelength in this wavelength range. For instance, in embodiments the second light source may be configured to generate light having a centroid wavelength selected from the wavelength range of 570-620 nm. Hence, in embodiments the second centroid wavelength may be selected from the yellow and/or orange wavelength range. The wavelength range of 570-620 nm is herein indicated as the yellow and/or orange wavelength range.

Hence, a peak wavelength of the (spectral power distribution of the) first light may have a smaller value than a peak wavelength of the (spectral power distribution of the) second light. Alternatively or additionally, a centroid wavelength of the first light may have a smaller value than a centroid wavelength of the second light.

The term "centroid wavelength", also indicated as $\lambda_C$, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda_C = \Sigma \lambda * I(\lambda)/\Sigma I(\lambda)$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

Further, it appears that high intensity and/or efficient lasers may be more abundant in the blue than in the yellow and/or orange wavelength range, whereas it also appears that SLDs may be available in the yellow orange wavelength range. Hence, it is herein proposed to use in embodiments (i) a blue pump laser and (ii) a yellow and/or orange SLD.

Hence, in embodiments the first light source may be configured to generate first light source light having one or more wavelengths in the blue wavelength range (440-495 nm) and having a first centroid wavelength ($\lambda_{C1}$). Especially, in embodiments the first light source comprises a laser. More especially, in embodiments the first light source is a laser (optionally including optics). Hence, especially the first light source light comprises laser light, more especially the first light source light may be laser light.

The phrase "having one or more wavelengths in a specific wavelength range", and similar phrases (such as "having one or more wavelengths in the blue wavelength range"), does not necessarily include that also intensity at wavelengths external from the specific wavelength range may be found. For instance, a green/yellow luminescent material (see also below) may in embodiments e.g. also have intensity in the orange wavelength range. Especially, however, this indication may indicate that the light having these one or more wavelengths in the specific wavelength range may also have the color related to that wavelength range. Hence, e.g. a centroid wavelength of the light one or more wavelengths in the specific wavelength range may be in that specific wavelength range.

Especially, the first light source may be used to pump a green and/or yellow emitting luminescent material. This may provide a relative small (Stokes) wavelength difference between (first) pump wavelengths and (first) emission wavelengths. Hence, in embodiments the first luminescent material may be configured to convert at least part of the first light source light into first luminescent material light having one or more wavelengths in the green and/or yellow wavelength range (495-590 nm). Yet, in embodiments, the first luminescent material may be configured to convert at least part of the first light source light into first luminescent material light having a peak wavelength in the green and/or yellow wavelength range. Alternatively or additionally, in embodiments, the first luminescent material may be configured to convert at least part of the first light source light into first luminescent material light having a centroid wavelength ($\lambda_{CL1}$) in the green and/or yellow wavelength range.

Hence, also in embodiments the second light source may be configured to generate second light source light having one or more wavelengths in the yellow and/or orange wavelength range and having a second centroid wavelength ($\lambda_{C2}$). Especially, in embodiments wherein $\lambda_{C2} > \lambda_{C1}$. For instance, in embodiments $\lambda_{C2} - \lambda_{C1} \geq 75$ nm, even more especially $\lambda_{C2} - \lambda_{C1} \geq 100$ nm. Hence, in specific embodiments 75 nm $\leq \lambda_{C2} - \lambda_{C1} \leq 180$ nm, such as especially 90 nm $\leq \lambda_{C2} - \lambda_{C1} \leq 150$ nm. Especially, in embodiments the second light source comprises a superluminescent diode. More especially, in embodiments the second light source is a superluminescent diode (optionally including optics). Hence, especially the second light source light comprises superluminescent diode light; more especially the second light source light is superluminescent diode light.

Especially, the second light source may be used to pump an orange and/or red emitting luminescent material. This may provide a relative small (Stokes) wavelength difference between (second) pump wavelengths and (second) emission wavelengths. Hence, in embodiments the second luminescent material may be configured to convert at least part of the second light source light into second luminescent material light having one or more wavelengths in the orange and/or red wavelength range (590-780 nm, especially 590-665 nm).

Yet, in embodiments, the second luminescent material may be configured to convert at least part of the second light source light into second luminescent material light having a peak wavelength in the orange and/or red wavelength range. Alternatively or additionally, the second luminescent material may be configured to convert at least part of the second light source light into second luminescent material light having a centroid wavelength in the orange and/or red wavelength range.

In embodiments, the first luminescent material is configured downstream of the first light source. Especially, in embodiments the first luminescent material is not configured downstream of the second light source and/or the second luminescent material. In embodiments, the second luminescent material is configured downstream of the second light source. Especially, in embodiments the second luminescent material is not configured downstream of the first light source and/or the first luminescent material.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The terms "radiationally coupled" or "optically coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material.

The first luminescent material light and the second luminescent material light may in embodiments (in an operational mode of the light generating system) be generated simultaneously. Hence, the system may in an operational mode provide system light comprising both the first luminescent material light and the second luminescent material light. In addition, the system light may comprise one or more of unconverted first light source light, unconverted second light source light, light source light of a third light source, luminescent material light of a further luminescent material, etc. Hence, in embodiments in an operational mode the light generating system is configured to generate system light comprising the first luminescent material light and the second luminescent material light.

Especially, the first luminescent material and the second luminescent material are (thus) different luminescent materials. The luminescent material light of the first luminescent material and the second luminescent material may have (thus) different spectral power distributions (i.e. especially green and/or yellow and orange and/or red, respectively).

As indicated above, in embodiments the system light may comprise unconverted first light source. This may in embodiments lead to system light also comprising a blue component based on unconverted first light source light. Basically, this may be achieved in two ways. In a first way, at least part of the first light source light bypasses the luminescent material(s) and ends up in the system light as unconverted first light. This may e.g. be the case when light of a light source is splitted in two (or more) parts, and a first part is guided to the first luminescent material and a second part is not guided to the luminescent material(s) and bypasses these materials. Alternatively or additionally, this may e.g. be the case when one or more first light sources are used to irradiate the first luminescent material and one or more other first light sources are used as sources of light for the system light (in an operational mode) and of which the light bypasses the luminescent material(s). Hence, in embodiments the system light may comprise first light source light. Therefore, in specific embodiments in an operational mode the light generating system is configured to generate system light comprising the first luminescent material light, the second luminescent material light, and first light source light. In such embodiments, all first light sources may e.g. be of the same bin, and light with the same spectral power distribution is used for exciting the first luminescent material and as blue component in the system light. Yet, in more specific embodiments in an operational mode the light generating system is configured to white generate system light comprising the first luminescent material light, the second luminescent material light, and first light source light. Optionally, the system light may also comprise (unconverted) second light source light.

Alternatively or additionally, in a second way the first system light may comprise blue light is by using a separate source of (blue) light. When such separate sources of light are identical to the first light sources, these are indicated as first light sources. However, when they are different, in terms of type, bin, and/or spectral power distribution, these may be indicated as third light source. This may allow choosing a first light source with a spectral power distribution of the first light especially suitable for exciting the first luminescent material and/or choosing a third light source with a spectral power distribution of the third light especially suitable for e.g. desirable spectral power distributions, like in terms of efficiency, efficacy, CRI, CCT, and color gamut.

Hence, in embodiments the system may comprise a third light source configured to generate third light source light having one or more wavelengths in the blue wavelength range. Hence, in embodiments the third light source may be configured to generate light having one or more wavelengths in the wavelength range of 440-495 nm, especially having a (third) centroid wavelength and/or peak wavelength in this wavelength range. For instance, in embodiments the third light source may be configured to generate light having a centroid wavelength selected from the wavelength range of 440-495 nm. Hence, in embodiments the third centroid wavelength may be selected from the blue wavelength range. Especially, the third light may have a third centroid wavelength ($\lambda_{C3}$), different from the first centroid wavelength ($\lambda_{C1}$). For instance, in embodiments 2 nm≤|$\lambda_{C3}$-$\lambda_{C1}$|≤55 nm, such as in embodiments 10 nm≤|$\lambda_{C3}$-$\lambda_{C1}$|≤40 nm, like in embodiments 15 nm≤|$\lambda_{C3}$-$\lambda_{C1}$|≤40 nm. However, the first centroid wavelength and the second centroid wavelength may also essentially be the same, like 0 nm≤|$\lambda_{C3}$-$\lambda_{C1}$|≤2 nm.

Therefore, in specific embodiments in an operational mode the light generating system may be configured to generate system light comprising the first luminescent material light, the second luminescent material light, and third light source light. In such embodiments, the first light sources and the third light sources may e.g. be of different bins, and light with different spectral power distributions is used for exciting the first luminescent material and as blue component in the system light, respectively. Yet, in more specific embodiments in an operational mode the light generating system is configured to white generate system light comprising the first luminescent material light, the second luminescent material light, and third light source light. Optionally, the system light may also comprise one or more of (unconverted) first light source light and (unconverted) second light source light.

Therefore, in specific embodiments the light generating system may comprise a third light source configured to generate third light source light having one or more wavelengths in the blue wavelength range (especially having a centroid wavelength of third light source light in the blue wavelength range); wherein in specific embodiments in an operational mode (of the light generating system) the light generating system is configured to generate white system light comprising third light source light, the first luminescent material light and the second luminescent material light.

In embodiments, the third light source comprises one or more of a (diode) laser and a superluminescent diode. Especially, in embodiments the third light source comprises a (diode) laser.

Here below, some embodiments in relation to the luminescent materials are described.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials. Examples of possible luminescent materials are indicated below.

In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq0.2$, wherein $y1+y2=1$, wherein $0\leq y2\leq0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}$ $(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $M_2Si_5N_8:Eu^{2+}$ and/or $MAlSiN_3:Eu^{2+}$ and/or $Ca_2AlSi_3O_2N_5:Eu^{2+}$, etc., wherein M comprises one or more of Ba, Sr and Ca, especially in embodiments at least Sr. In embodiments, the luminescent may comprise one or more materials selected from the group consisting of (Ba,Sr,Ca)S:Eu, (Ba,Sr,Ca)AlSiN$_3$:Eu and (Ba, Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)AlSiN$_3$:Eu and (Ba,Sr, Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$: $Ce^{3+}$), or similar compounds, or BAM ($BaMgAl_{10}O_{17}$: $Eu^{2+}$), or similar compounds.

The term "luminescent material" herein especially relates to inorganic luminescent materials.

Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

The (inorganic) luminescent material may in embodiments be provided as single crystal, or as ceramic body, or a luminescent material dispersed in another material, like polymeric material (of a polymeric body). Organic luminescent materials and/or quantum dots may also be dispersed in another material, like polymeric material (of a polymeric body).

Especially, in embodiments the first luminescent material may comprise a luminescent material of the type $A_3B_5O_{12}$:Ce, wherein A comprises one or more of Y, La, Gd, Tb and Lu, and wherein B comprises one or more of Al, Ga, In and Sc. As indicated above, such type of luminescent material may be relatively efficient. Alternatively or additionally, in embodiments the first luminescent material may comprise a luminescent material of the type $A_3Si_6N_{11}$:$Ce^{3+}$, wherein A comprises one or more of Y, La, Gd, Tb and Lu, especially one or more of La and Y.

Note that one or more first luminescent materials may be applied. Further a first luminescent material may be irradiated (in an operational mode) by one or more first light sources. Hence, when applying two or more different first luminescent materials, each of the first luminescent materials may be irradiated (in an operational mode) by one or more first light sources.

In specific embodiments, the system may comprise a ceramic body, wherein the ceramic body comprises the first luminescent material. For instance, the first luminescent material may be provided as ceramic body. The ceramic body may be useful in terms of thermal conductivity and/or may be used e.g. in a transmissive mode.

Ceramic bodies are known in the art. Especially, the ceramic material may be obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure.

Alternatively or additionally, the second luminescent material comprises a luminescent material selected from the group consisting of MS:$Eu^{2+}$, wherein M comprises one or more of calcium and strontium; $M_2Si_5N_8$:$Eu^{2+}$, wherein M comprises one or more of calcium and strontium and barium; $MAlSiN_3$:$Eu^{2+}$, wherein M comprises one or more of calcium and strontium; $MLi_2Al_2O_2N_2$:$Eu^{2+}$, wherein M comprises strontium; $MLiAl_3N_4$:$Eu^{2+}$, wherein M comprises strontium; $MCaSiN_2$:$Ce^{3+}$, wherein M comprises one or more of calcium and strontium; and $M(Si,Al)N_2$:$Ce^{3+}$, wherein M comprises calcium. Such luminescent materials may be relatively efficient, and/or may have relatively small stokes shifts, and/or may be relatively stable.

Note that one or more second luminescent materials may be applied. Further a second luminescent material may be irradiated (in an operational mode) by one or more second light sources. Hence, when applying two or more different second luminescent materials, each of the second luminescent materials may be irradiated (in an operational mode) by one or more second light sources.

In specific embodiments, the second light source may be configured to generate second light source light having one or more wavelengths in the wavelength range of 570-620 nm. Hence, in specific embodiments the second centroid wavelength $\lambda_{C2}$ may be selected from the range of 570-620 nm. Alternatively or additionally, the second luminescent material may be configured to convert at least part of the second light source light into second luminescent material light having one or more wavelengths in the wavelength range of 610-665 nm, such as about 610-635 nm, e.g. 610-625 nm. In yet further specific embodiments a centroid wavelength $\lambda_{L2}$ of the second luminescent material light may be selected from the range of 610-625 nm, such as 610-635 nm, like at least 615 nm. Especially, $\lambda_{C2}<\lambda_{L2}$. For instance, in embodiments 5 nm$\leq\lambda_{L2}-\lambda_{C2}\leq$85 nm, such as especially 10 nm$\leq\lambda_{L2}-\lambda_{C2}\leq$65 nm. Hence, in embodiments the first light source is configured to generate first light source light having one or more wavelengths in the wavelength range of 440-495 nm. Alternatively or additionally, in embodiments the second light source is configured to generate second light source light having one or more wavelengths in the wavelength range of 570-620 nm. Alternatively or additionally, in embodiments the first luminescent material is configured to convert at least part of the first light source light into first luminescent material light having one or more wavelengths in the wavelength range of 495-590 nm. Alternatively or additionally, in embodiments the second luminescent material is configured to convert at least part of the second light source light into second luminescent material light having one or more wavelengths in the wavelength range of 610-665 nm.

Therefore, in specific embodiments, the first light source is configured to generate first light source light having a centroid wavelength in the wavelength range of 440-495 nm. Alternatively or additionally, in embodiments the second light source is configured to generate second light source light having a centroid wavelength in the wavelength range of 570-620 nm. Alternatively or additionally, in embodiments the first luminescent material is configured to convert at least part of the first light source light into first luminescent material light having a centroid wavelength in the wavelength range of 495-590 nm. Alternatively or additionally, in embodiments the second luminescent material is configured to convert at least part of the second light source light into second luminescent material light having a centroid wavelength in the wavelength range of 610-665 nm.

A luminescent material may be configured in the reflective mode or in the transmissive mode. In the transmissive mode, it may be relatively easy to have light source light admixed in the luminescent material light, which may be useful for generating the desirable spectral power distribution. In the reflective mode, thermal management may be more easy, as a substantial part of the luminescent material may be in thermal contact with a thermally conductive element, like a heatsink or heat spreader. In the reflective mode, a part of the light source light may in embodiments be reflected by the luminescent material and/or a reflector and may be admixed in the luminescent material light. The reflector may be configured downstream of the luminescent material (in the reflective mode).

Hence, the luminescent materials may be operated in the transmissive mode or reflective mode; this may also differ between the two luminescent materials; or both luminescent materials are operated in the same mode. Therefore, in embodiments one or more of the first luminescent material and the second luminescent material are operated in a reflective mode.

Note that is herein not excluded to use more than two different luminescent materials and/or further light sources, other than the first light sources, second light sources, and third light sources. Hence, in embodiments the system light may comprise other contributions than the herein indicated possible contributions of the first light source light, second light source light, the first luminescent material light, the second luminescent material light, and the third light source light. Especially, in embodiments in operational modes at least 90% of the spectral power of the system light in the visible wavelength range (i.e. 380-780 nm) is defined by one or more of the first light source light, second light source light, the first luminescent material light, the second luminescent material light, and the third light source light, such as at least 95%. Hence, in embodiments when integrating the spectral power over the wavelength range of 380-780 nm, at least 90% stems from one or more of the first light source light, second light source light, the first luminescent material light, the second luminescent material light, and the third light source light. The contributions of the first light source light, second light source light, the first luminescent material light, the second luminescent material light, and the third light source light may depend upon the operational mode.

Light of different sources of light, such as the first luminescent material, the second luminescent material, and optionally one or more of the first light source light, the second light source light and the optional third light source light may be combined into one beam of light. Especially, the system may be configured to generate a beam of system light comprising one or more of first luminescent material light and the second luminescent material, and optionally one or more of the first light source light, the second light source light and the optional third light source light. To this end the system may comprise optics. The term "optics" may especially refer to (one or more) optical elements. The optics may include one or more or mirrors, reflectors, collimators, lenses, prisms, diffusers, phase plates, polarizers, diffractive elements, gratings, dichroics, arrays of one or more of the afore-mentioned, etc.

Especially, in embodiment the optics may at least comprise light mixing optics, such as light combining elements configured two or more (different) beams of light, e.g. light from the first luminescent material and light from the second luminescent material.

In embodiments, the light mixing optics may comprise one or more of diffusers (surface or volume scattering diffusers or engineered holographic optical elements), light pipes, light guides, Koehler integrator optics, etc. Alternatively or additionally, the light mixing optics may comprise a collimator or other collimating optics. Alternatively or additionally, the light mixing optics may comprise a dichroic beam combiner, such as in specific embodiments a dichroic cube.

Hence, in embodiments the system may comprise one or more light combining elements configured to combine in the operational mode at least the first luminescent material light and the second luminescent material light. Hence, in specific embodiments the system may comprise one or more light combining elements configured to combine in the operational mode and optionally one or more of the first light source light, the second light source light and the optional third light source light (into one beam of light). Here, the phrase "one or more light combining elements configured to combine in the operational mode at least the first luminescent material light and the second luminescent material light", and similar phrases, are used, to indicate that when such types of light are provided, the light combining element(s) may combine these. Hence, such optics are configured to combine such types of light when these are available when in an operational mode of the system such types of light are actually provided.

At an exit of the system, beam shaping optics or a diffusor may be provided, to provide a beam-shaped beam or a beam of diffuse light, respectively.

As indicated above, the luminescent materials may provide heat when being irradiated. Further, the light sources may provide heat when being operated. To this end, the system may also comprise one or more heatsinks, and/or one or more heat spreaders, and/or one or more active cooling elements, etc.

Especially, in embodiments one or more of first luminescent material and the second luminescent material may be thermally coupled to a thermally conductive element.

A thermally conductive element especially comprise thermally conductive material. A thermally conductive material may especially have a thermal conductivity of at least about 20 W/m/K, like at least about 30 W/m/K, such as at least about 100 W/m/K, like especially at least about 200 W/m/K. In yet further specific embodiments, a thermally conductive material may especially have a thermal conductivity of at least about 10 W/m/K.

In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

Heatsinks are known in the art. The term "heatsink" (or heatsink) may especially be a passive heat exchanger that transfers the heat generated by device, such as an electronic device or a mechanical device, to a fluid (cooling) medium, often air or a liquid coolant. Thereby, the heat is (at least partially) dissipated away from the device. A heatsink is especially designed to maximize its surface area in contact with the fluid cooling medium surrounding it. Hence, especially a heatsink may comprise a plurality of fins. For instance, the heatsink may be a body with a plurality of fins extending thereof.

A heatsink especially comprises (more especially consists of) a thermally conductive material. The term "heatsink" may also refer to a plurality of (different) heatsinks.

Hence, in embodiments one or more of the first luminescent material and the second luminescent material may be supported by a thermally conductive support. Especially, in embodiments (both) the first luminescent material and the second luminescent material are supported by a thermally conductive support.

In embodiments, the luminescent material, such as a luminescent body, may be thermally coupled with the thermally conductive element, such as heatsink, but may not be optically coupled.

When elements are in optical contact or optically coupled, they may in embodiments be in physical contact with each other or may in other embodiments be separated from each other with e.g. a (thin) layer of optical material, such as an optical glue, or other optically transparent interface material, e.g. having a thickness of less than about 1 mm, preferably less than 100 µm. When no optically transparent interface material is applied, the (average) distance between two elements being in optical contact may especially be about at maximum the wavelength of relevance, such as the wavelength of an emission maximum. For visible wavelengths, this may be less than 1 µm, such as less than 0.7 µm, and for blue even smaller. Hence, when optical coupling is desired, an optically transparent interface material may be applied. In yet other embodiments, when no optically transparent interface material is applied, the average distance between two elements being in optical contact may especially be about at maximum the wavelength of relevance, such as the wavelength of an emission maximum. Hence, when optical contact is desired, there may be physical contact. However, even in such embodiments there may be a non-zero average distance, but then equal to or lower than the wavelength of interest, such as a centroid wavelength of the laser radiation.

In embodiments, such support may be reflective. In such embodiments, the luminescent materials may be operated in the reflective mode. In other embodiments, the support may be optical transmissive. In such embodiments, the luminescent materials may be operated in the transmissive mode.

In a specific embodiment, the system may comprise an integrated light source package, wherein the integrated light source package comprises a common support member configured to support the plurality of light sources, the first luminescent material, and the second luminescent material, wherein common support member comprises the thermally conductive support. The plurality of light source may provide their light source light with optical axes having an angle α with a surface of the respective luminescent materials selected from the range of at least 20° and smaller than 90°. Especially, in embodiments α may be selected from the range of 30-60°. Further, in specific embodiments n light sources lasers may be provided under 360/n angle with respect to each other.

Further, the system may comprise or be functionally coupled to a control system. The control system may control the light generating device and optionally other devices, such as indicated above.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Wifi, ZigBee, BLE or WiMax, or another wireless technology.

The system, or apparatus, or device may execute an action in a "mode" or "operation mode" or "operational mode" or "mode of operation" or "control mode". Likewise, in a method an action or stage, or step may be executed in a "mode" or operation mode" or "operational mode" or "mode of operation" or "control mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Especially, by controlling the plurality of light sources, a spectral power distribution of the system light may be controlled. This may be done by controlling each light source individually, or this may be done by controlling two or more subsets of the plurality of light sources, wherein each subset comprises one or more light sources, e.g. one or more first subsets each comprising one or more first light sources, and one or more second subsets each comprising one or more second light sources, and optionally one or more third subsets, each comprising one or more third light sources.

Hence, the system may comprise a control system configured to individually control (i) (one or more of) the one or more first light sources and (ii) (one or more of) the one or more second light sources (and optionally (one or more of) the one or more third light sources), thereby controlling a spectral power distribution of the system light.

In one or more operational modes, the system light may be white (system) light. The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The terms "visible", "visible light" or "visible emission" and similar terms refer to light having one or more wavelengths in the range of about 380-780 nm. Herein, UV may especially refer to a wavelength selected from the range of 200-380 nm.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. The light generating system may also be used for disinfection or optical wireless communication. Hence, in an aspect the invention also provides a light generating device selected from the group of a lamp, a luminaire, a projector device, a disinfection device, and an optical wireless communication device, comprising the light generating system as defined herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
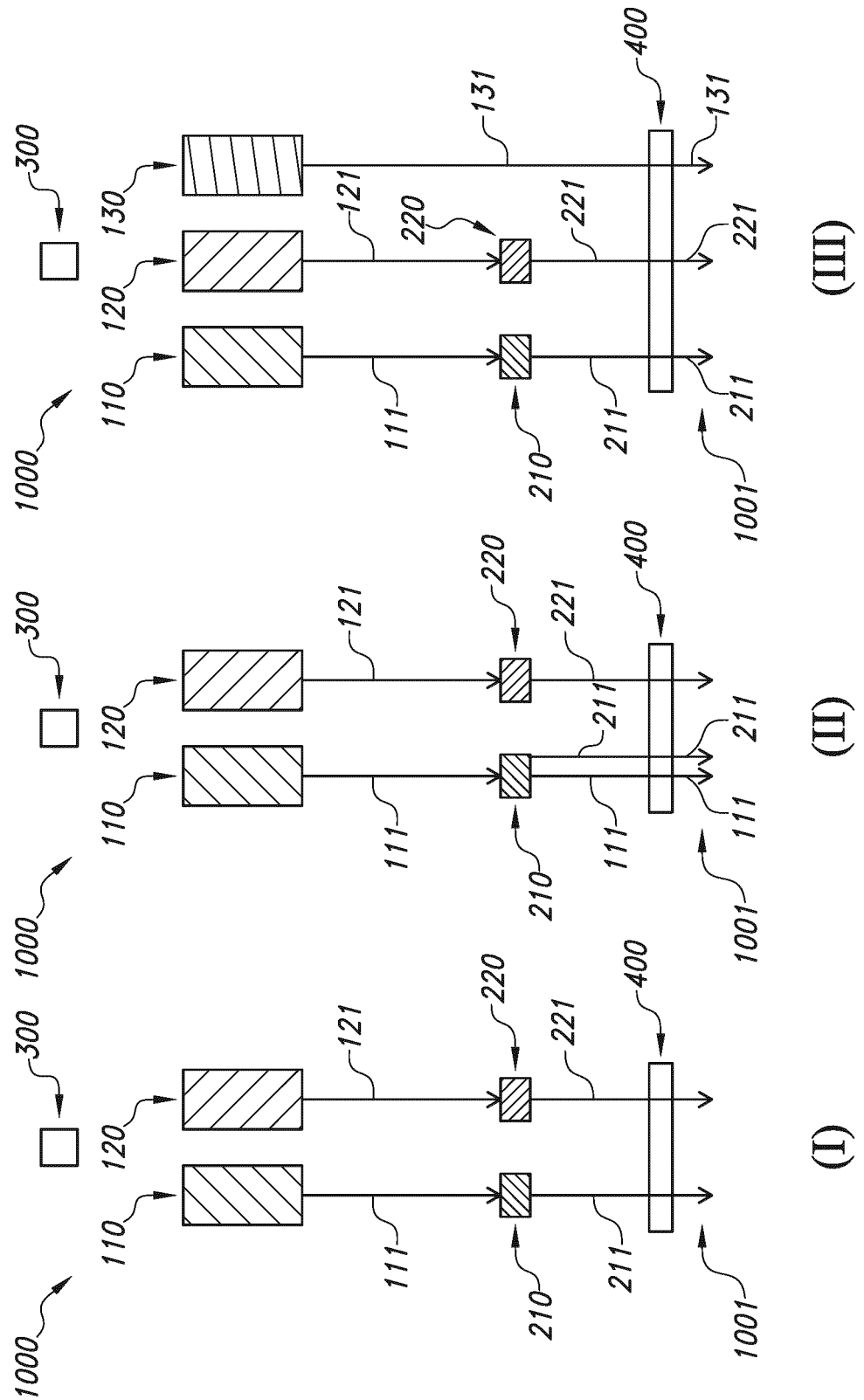
FIGS. 1a-1c schematically depicts an embodiment and variations.

FIG. 1a schematically depict a number of embodiments of the light generating system 1000. All three embodiments operate the luminescent materials in the transmissive mode. However, as shown in FIG. 1c, see below, also the reflective mode may be applied. Further, it is also possible to operate one luminescent material in the transmissive mode and another one in the reflective mode. Hence, in embodiments one or more of the first luminescent material 210 and the second luminescent material 220 may be operated in a transmissive mode.

The system 1000 comprises (i) a plurality of light sources 110, 120, . . . , (ii) a first luminescent material 210, and (iii) a second luminescent material 220. The phrase "plurality of light sources 110, 120, . . . " may in embodiments indicate that the plurality of light sources may comprise at least a first type of light sources and a second type of light sources, and optionally further type of light sources.

A first light source 110 is configured to generate first light 111, especially having one or more wavelengths in the blue wavelength range and in embodiments having a first centroid wavelength xci. Especially, in embodiments the first light source 110 comprises one or more lasers (here one laser is schematically depicted). The first luminescent material 210 is configured to convert at least part of the first light source light 111 into first luminescent material light 211, especially having one or more wavelengths in the green and/or yellow wavelength range.

A second light source 120 is configured to generate second light 121 having one or more wavelengths in the yellow and/or orange wavelength range and having a second centroid wavelength $\lambda_{C2}$. Especially, in embodiments $\lambda_{C2} > \lambda_{C1}$. Further, in embodiments the second light source 120 may comprise one or more superluminescent diodes (here one SLD is schematically depicted). In embodiments, the second luminescent material 220 may be configured to convert at least part of the second light 121 into second luminescent material light 221. Especially having one or more wavelengths in the orange and/or red wavelength range.

Figure 2A:
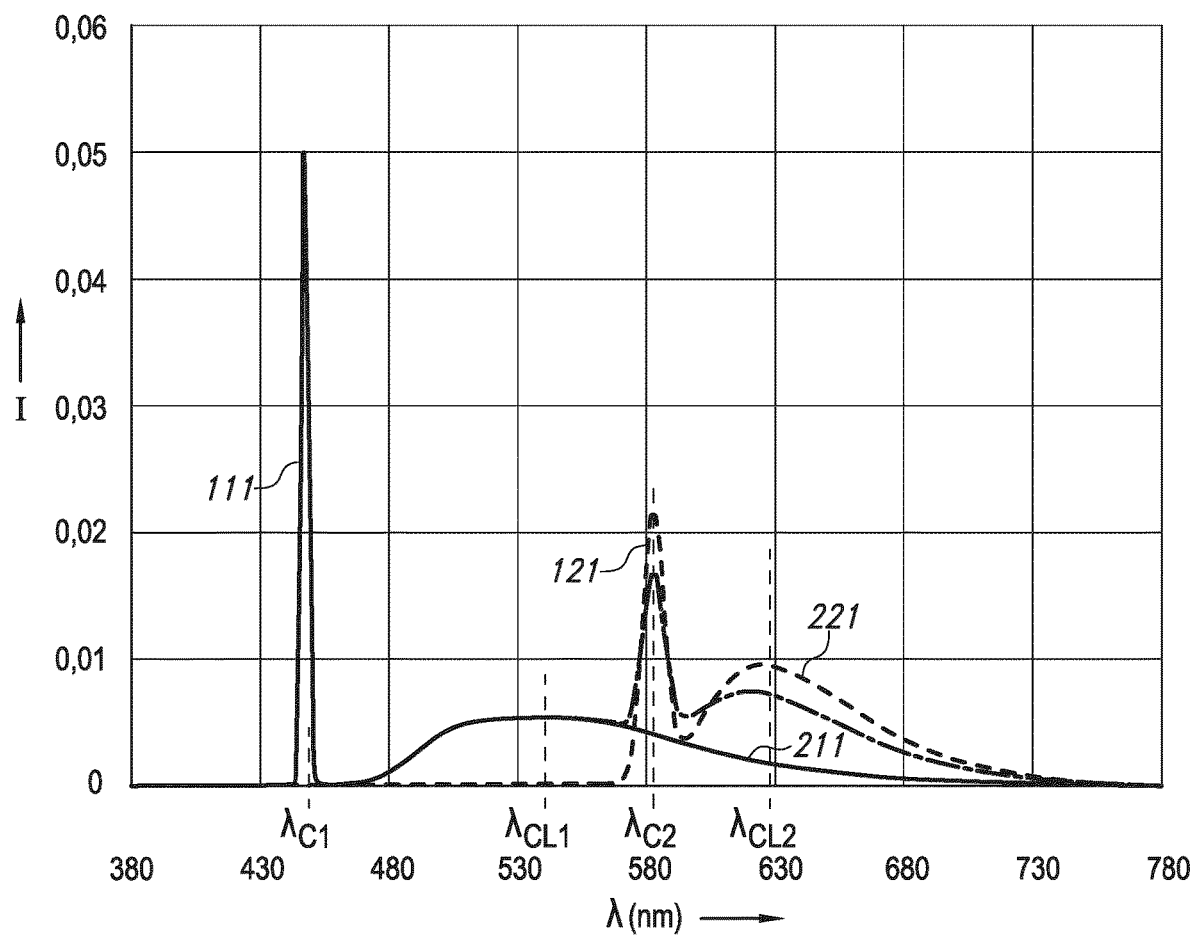
FIGS. 2a-2b schematically depict some spectral power distributions.
Figure 2B:
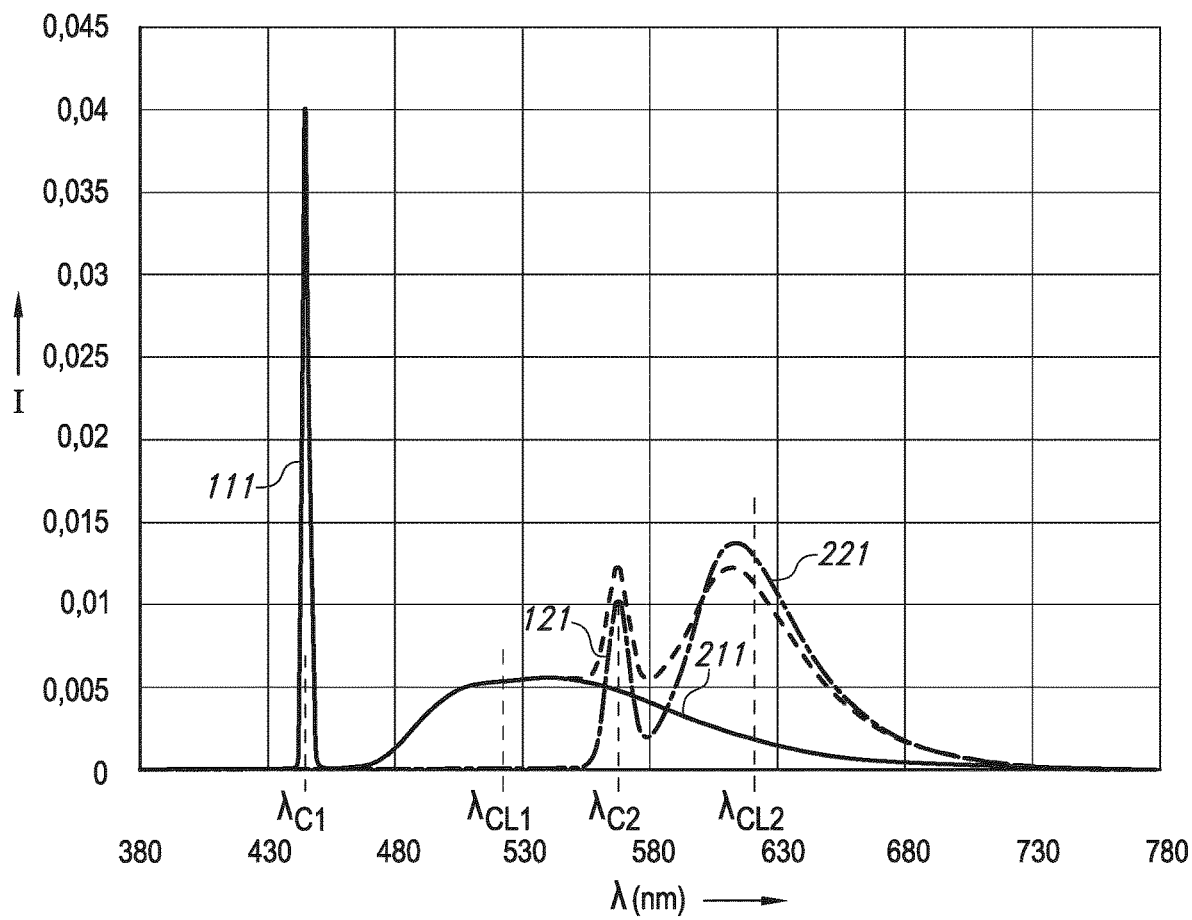

In embodiments, in an operational mode (of the system 1000) the light generating system 1000 is configured to generate system light 1001 comprising the first luminescent material light 211 and the second luminescent material light 221 (see e.g. also FIGS. 2a-2b).

Referring to embodiment I of FIG. 1a, in an operational mode the system light may essentially consist of first luminescent material light 211 and the second luminescent material light 221 as there may be no unconverted light source light 111, 121 (e.g. 100% of the spectral power may consist of these contributions). In embodiment II of FIG. 1a, it is shown that part of the first light source light 111 may also end up in the system light 1001. In such embodiments, in an operational mode (of the system 1000), the system light may comprise first luminescent material light 211, the second luminescent material light 221, and first light source light 111. Alternatively or additionally to the first light source light 111, the system light 1001 may comprise (in the operational mode) second light source light 121. In embodiment III of FIG. 1a, a third light source 130 is applied. Hence, the system 1000 may comprise a third light source 130 configured to generate third light source light 131 having one or more wavelengths in the blue wavelength range. Here, the third light source light 131 bypasses the luminescent materials 210, 220. In such embodiments, in the operational mode the light generating system 1000 is configured to generate white system light 1001 comprising third light source light 131, the first luminescent material light 211 and the second luminescent material light 221. In embodiments, the third light source 130 may comprise one or more of a (diode) laser and a superluminescent diode.

Reference 400 refers to an end window or an optical element, especially an optical element, like a beam shaping element and/or a light homogenizer (see further also below).

Reference 300 refers to a control system. Hence, the light generating system 1000 may comprise the control system 300, wherein the control system may especially be configured to individually control (i) one or more of the one or more first light sources 110 and (ii) one or more of the one or more second light sources 120. Thereby a spectral power distribution of the system light 1001 (see also FIGS. 2a-2b) may be controlled. Referring to embodiment III, when individually controlling the first light source(s) 110, the second light source(s) 120, and the third light source(s) 130, one may create system light 1001 comprising one or more of the first luminescent material light 211, the second luminescent material light 221, and third light source light 131.

Figure 1B:
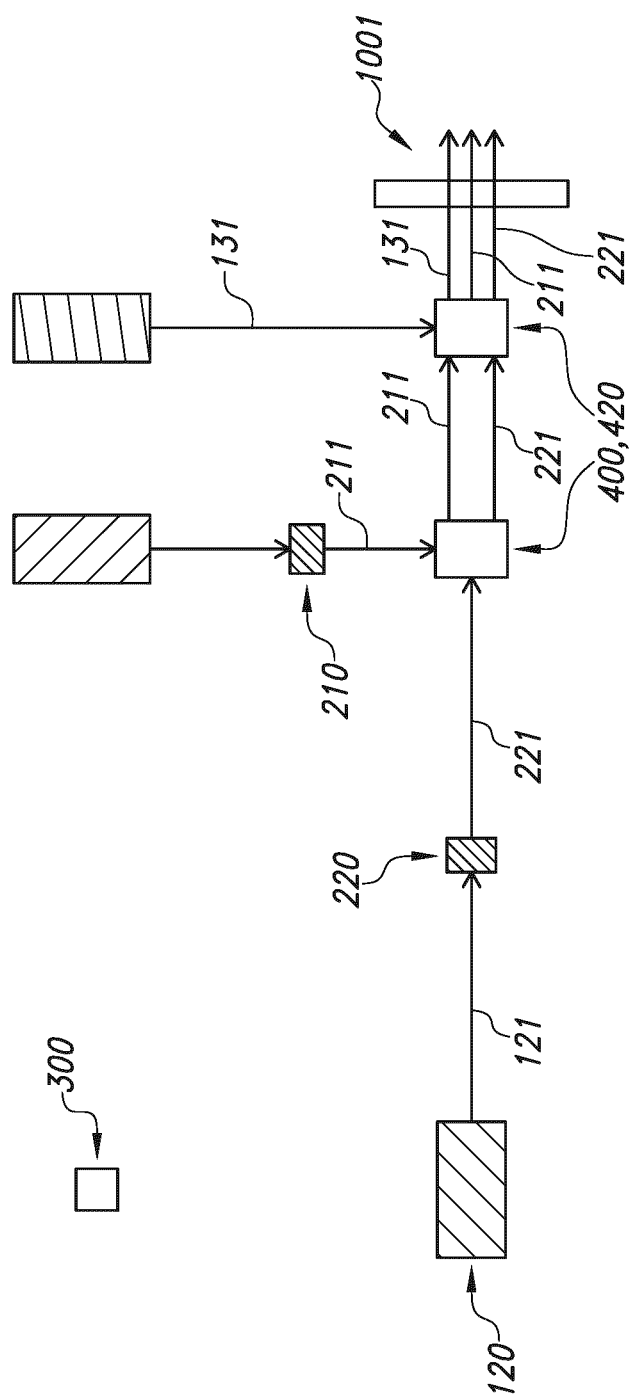
Figure 1C:
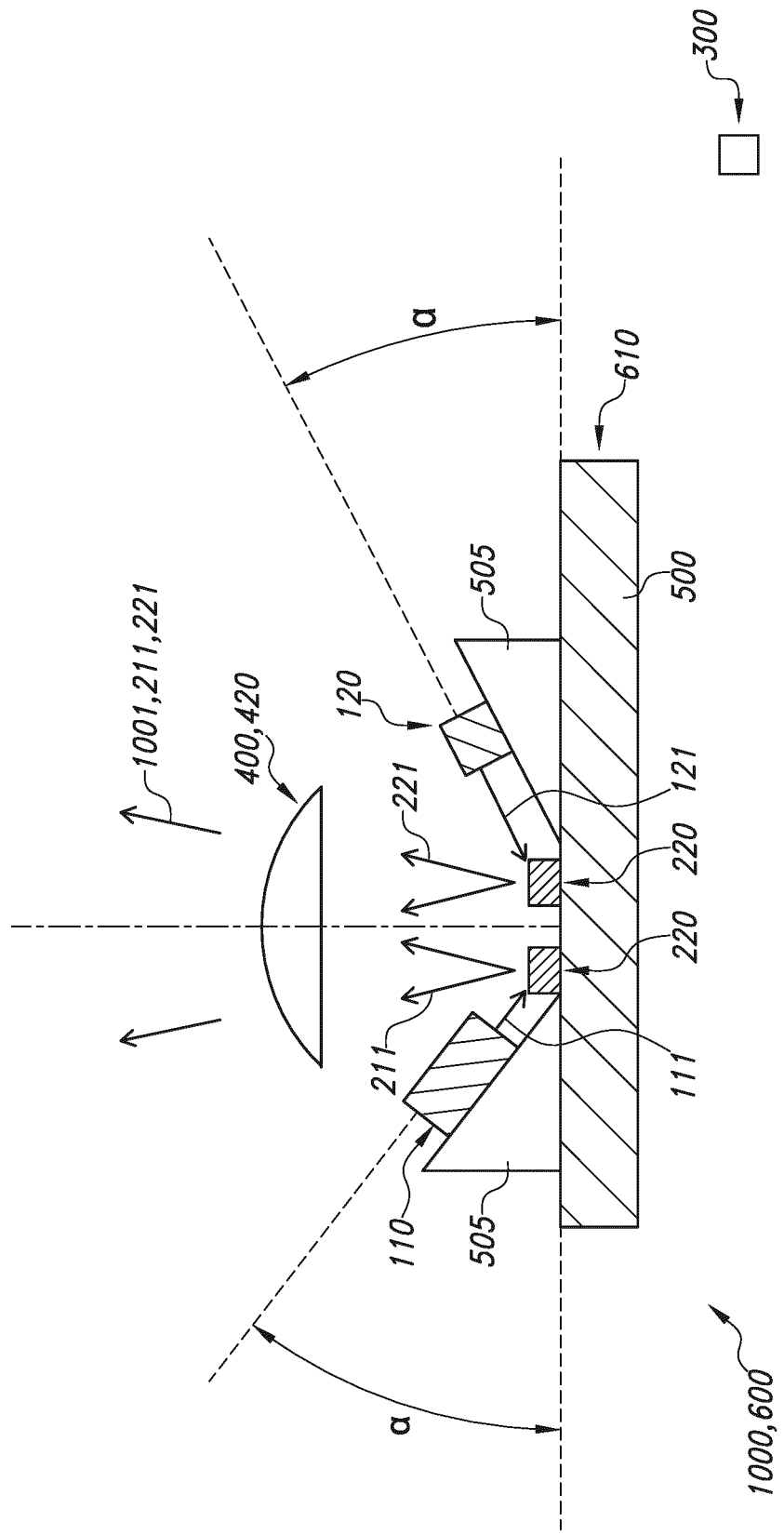

FIG. 1b schematically depicts a further embodiment, wherein one or more light combining elements 420 are applied. The one or more light combining elements 420 may be configured to combine in the operational mode at least the first luminescent material light 211 and the second luminescent material light 221. The one or more light combining elements 420 may be configured to combine in the operational mode the first luminescent material light 211, the second luminescent material light 221, and the third light source light 131. The system light 1001 may escape from the system via an end window or an optical element, especially an optical element, like a beam shaping element and/or a light homogenizer (see also above).

FIG. 1c schematically depicts further embodiments, combined in a single drawing, showing the use of a support and the use of the reflective mode. Note, however, that a support may also be optically transmissive. Hence, a support may also be used in combination with the transmissive mode. FIG. 1c schematically depicts an embodiment wherein one or more of the first luminescent material 210 and the second luminescent material 220 are operated in a reflective mode. Here, both are configured/operated in the reflective mode. The support may be thermally conducive. Hence, FIG. 1c also schematically depicts an embodiment wherein the first luminescent material 210 and the second luminescent material 220 are supported by a thermally conductive support 500. Further, FIG. 1c schematically depicts an embodiment of an integrated light source package 600, wherein the integrated light source package 600 may comprise a common support member 610 configured to support the plurality of light sources 110, 120, . . . , the first luminescent material 210, and the second luminescent material 220, wherein common support member 610 comprises the thermally conductive support 500. Element(s) 505 may be used to support the plurality of light sources. elements 505 and the support 500 may be a monolithic support member 610. Whether or not, elements 505 may also comprise thermally conductive material. The plurality of light source may provide their light source light with optical axes having an angle α with a surface of the respective luminescent materials selected from the range of at least 20° and smaller than 90°. Especially, in embodiments a may be selected from the range of 30-60°.

Referring to e.g. FIGS. 1a-1c (and also 2a-2b), in embodiments, the first luminescent material 210 may comprise a luminescent material of the type $A_3B_5O_{12}$:Ce, wherein A comprises one or more of Y, La, Gd, Tb and Lu, and wherein B comprises one or more of Al, Ga, In and Sc, and/or another first luminescent material (see also above), such as a nitride based luminescent material. In embodiments, the system 1000 may comprise a ceramic body 1210, wherein the ceramic body 1210 comprises the first luminescent material 210. In embodiments, the second luminescent material 220 comprises a luminescent material selected from the group consisting of MS:$Eu^{2+}$, wherein M comprises one or more of calcium and strontium; $M_2Si_5N_8$:$Eu^{2+}$, wherein M comprises one or more of calcium and strontium and barium; MAlSiN$_3$:$Eu^{2+}$, wherein M comprises one or more of calcium and strontium; MLi$_2$Al$_2$O$_2$N$_2$:$Eu^{2+}$, wherein M comprises strontium; MLiAl$_3$N$_4$:$Eu^{2+}$, wherein M comprises strontium; MCaSiN$_2$:$Ce^{3+}$, wherein M comprises one or more of calcium and strontium; and M(Si,Al)N$_2$:$Ce^{3+}$, wherein M comprises calcium.

Further, also referring to e.g. FIGS. 1a-1c (and also 2a-2b), in embodiments, the first light source 110 is configured to generate first light 111 having one or more wavelengths in the wavelength range of 440-495 nm. Alternatively or additionally, in embodiments the second light source 120 is configured to generate second light 121 having one or more wavelengths in the wavelength range of 570-620 nm. Further, in specific embodiments, the second luminescent material 220 is configured to convert at least part of the second light 121 into second luminescent material light 221 having one or more wavelengths in the wavelength range of 610-625 nm.

Here below, a number of embodiments are indicated:

|  | FIG. 2a | FIG. 2b |
|---|---|---|
| Centroid λ laser (nm) ($\lambda_{C1}$) | 447 | 447 |
| First luminescent material | LuAG:Ce$^{3+}$ ($Lu_3Al_5O_{12}$:Ce$^{3+}$) | LuAG:Ce$^{3+}$ ($Lu_3Al_5O_{12}$:Ce$^{3+}$) |
| Centroid λ first luminescent material (nm) | 559 | 559 |
| Centroid λ SLD (nm) ($\lambda_{C2}$) | 582 | 570 |
| Second luminescent material | (Ca,Sr)AlSiN$_3$:Eu$^{2+}$ (SCASN) | SrLi$_2$Al$_2$O$_2$N$_2$:Eu$^{2+}$ (SALON:Eu$^{2+}$) |
| Centroid λ second luminescent material (nm) | 633 | 622 |
| Efficiency (Lm/W) | 127 | 133 |

Here below, some further examples are provided:

| Centroid λ laser (nm) ($\lambda_{C1}$) | 457 | 437 |
|---|---|---|
| First luminescent material | LSN:Ce3+ (La,Y)$_3$Si$_6$N$_{11}$:Ce$^{3+}$ | GaYAG:Ce$^{3+}$ Y$_3$(Al,Ga)$_5$O$_{12}$:Ce$^{3+}$) |
| Centroid λ first luminescent material (nm) | 575 | 554 |
| Centroid λ SLD (nm) ($\lambda_{C2}$) | 571 | 561 |
| Second luminescent material | CaS:Eu$^{2+}$ | HP-CaSiN$_2$:Ce$^{3+}$ |
| Centroid λ second luminescent material (nm) | 660 | 622 |
| Efficiency (Lm/W) | 94 | 71 |

Referring to FIGS. 2a-2b, reference $\lambda_{CL1}$ refers to the centroid wavelength of the first luminescent material light 211, and $\lambda_{CL2}$ refers to the centroid wavelength of the second luminescent material light 221. Hence, $\lambda_{C1} < \lambda_{CL1} < \lambda_{CL2} < \lambda_{CL2}$. Especially, each centroid wavelength differs at least 10 nm with the other centroid wavelengths, like at least 20 nm. Data in relation to FIGS. 2a-2b are also found in one of the tables above. Referring to FIGS. 2a-2b, when integrating the (respective) spectral power over the wavelength range of 380-780 nm, at least 90% stems from one or more of the first light source light, second light source light, the first luminescent material light, the second luminescent material light, and the third light source light. The contributions of the first light source light, second light source light, the first luminescent material light, the second luminescent material light, and the third light source light may depend upon the (respective) operational mode.

Figure 3:
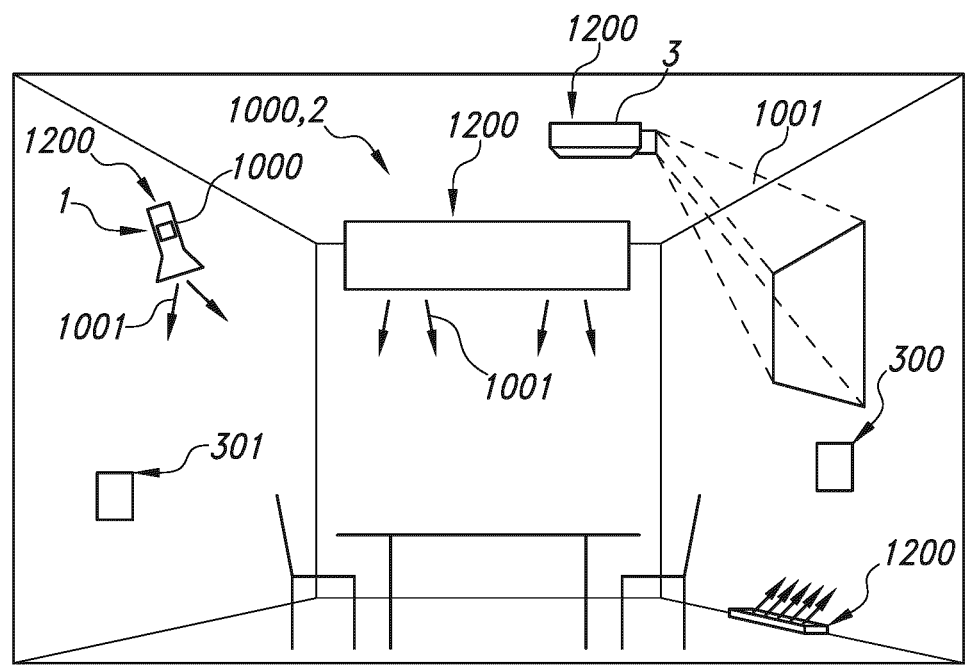
FIG. 3 shows some applications.

FIG. 3 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 3 schematically depicts embodiments of a light generating device 1200 selected from the group of a lamp 1, a luminaire 2, a projector device 3, a disinfection device, and an optical wireless communication device, comprising the light generating system 1000 as described herein.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising (i) a plurality of light sources, (ii) a first luminescent material, and (iii) a second luminescent material, wherein:
    a first light source is configured to generate first light source light having one or more wavelengths in the blue wavelength range and having a first centroid wavelength ($\lambda_{C1}$), wherein the first light source comprises a laser;
    the first luminescent material is configured to convert at least part of the first light source light into first luminescent material light having one or more wavelengths in the green and/or yellow wavelength range;
    a second light source is configured to generate second light source light having one or more wavelengths in the yellow and/or orange wavelength range and having a second centroid wavelength ($\lambda_{C2}$), wherein $\lambda_{C2} > \lambda_{C1}$; wherein the second light source comprises a superluminescent diode;
    the second luminescent material is configured to convert at least part of the second light source light into second luminescent material light having one or more wavelengths in the orange and/or red wavelength range; and
    in an operational mode the light generating system is configured to generate system light comprising the first luminescent material light and the second luminescent material light.

2. The light generating system according to claim 1, comprising a third light source configured to generate third light source light having one or more wavelengths in the blue wavelength range; wherein in the operational mode the light generating system is configured to generate white system light comprising third light source light, the first luminescent material light and the second luminescent material light.

3. The light generating system according to claim 2, wherein the third light source comprises one or more of a laser and a superluminescent diode.

4. The light generating system according to claim 1, wherein the first luminescent material comprises a luminescent material of the type $A_3B_5O_{12}$:Ce, wherein A comprises one or more of Y, La, Gd, Tb and Lu, and wherein B comprises one or more of Al, Ga, In and Sc, and/or wherein the first luminescent material comprises a luminescent material of the type $A_3Si_6N_{11}$:Ce$^{3+}$, wherein A comprises one or more of La and Y.

5. The light generating system according to claim 1, comprising a ceramic body, wherein the ceramic body comprises the first luminescent material.

6. The light generating system according to claim 1, wherein the second luminescent material comprises a luminescent material selected from the group consisting of MS:Eu$^{2+}$, wherein M comprises one or more of calcium and strontium; $M_2Si_5N_8$:Eu$^{2+}$, wherein M comprises one or more of calcium and strontium and barium; MAlSiN$_3$:Eu$^{2+}$, wherein M comprises one or more of calcium and strontium; MLi$_2$Al$_2$O$_2$N$_2$:Eu$^{2+}$, wherein M comprises strontium; MLiAl$_3$N$_4$:Eu$^{2+}$, wherein M comprises strontium; MCaSiN$_2$:Ce$^{3+}$, wherein M comprises one or more of calcium and strontium; and M(Si,Al)N$_2$:Ce$^{3+}$, wherein M comprises calcium.

7. The light generating system according to claim 1, wherein the first light source is configured to generate first light source light having one or more wavelengths in the wavelength range of 440-495 nm, wherein the second light source is configured to generate second light source light having one or more wavelengths in the wavelength range of 570-620 nm; wherein the first luminescent material is configured to convert at least part of the first light source light into first luminescent material light having one or more wavelengths in the wavelength range of 495-590 nm, and wherein the second luminescent material is configured to convert at least part of the second light source light into second luminescent material light having one or more wavelengths in the wavelength range of 610-665 nm.

8. The light generating system according to claim 1, wherein the first light source is configured to generate first light source light having a centroid wavelength in the wavelength range of 440-495 nm, wherein the second light source is configured to generate second light source light having a centroid wavelength in the wavelength range of 570-620 nm; wherein the first luminescent material is configured to convert at least part of the first light source light into first luminescent material light having a centroid wavelength in the wavelength range of 495-590 nm, and wherein the second luminescent material is configured to convert at least part of the second light source light into second luminescent material light having a centroid wavelength in the wavelength range of 610-665 nm.

9. The light generating system according to claim 1, wherein one or more of the first luminescent material and the second luminescent material are operated in a reflective mode.

10. The light generating system according to claim 1, wherein one or more of the first luminescent material and the second luminescent material are operated in a transmissive mode.

11. The light generating system according to claim 1, comprising one or more light combining elements configured to combine in the operational mode at least the first luminescent material light and the second luminescent material light.

12. The light generating system according to claim 1, wherein the first luminescent material and the second luminescent material are supported by a thermally conductive support.

13. The light generating system according to claim 1, comprising an integrated light source package, wherein the integrated light source package comprises a common support member configured to support the plurality of light sources, the first luminescent material, and the second luminescent material, wherein common support member comprises the thermally conductive support according to claim 12.

14. The light generating system according to claim 1, comprising a control system configured to individually control (i) one or more of the one or more first light sources and (ii) one or more of the one or more second light sources, thereby controlling a spectral power distribution of the system light.

15. A light generating device selected from the group of a lamp, a luminaire, a projector device, a disinfection device, and an optical wireless communication device, comprising the light generating system according to claim 1.

* * * * *